(12) United States Patent
Flournoy et al.

(10) Patent No.: US 7,405,941 B2
(45) Date of Patent: Jul. 29, 2008

(54) STORAGE ARRAY WITH ENHANCED RVI SUPPRESSION

(75) Inventors: Fred Wayne Flournoy, Colorado Springs, CO (US); David Peter DeCenzo, Pueblo, CO (US); Erik Riedel, Pittsburgh, PA (US)

(73) Assignee: Seagate Technology LLC, Scotts Valley, CA (US)

( * ) Notice: Subject to any disclaimer, the term of this patent is extended or adjusted under 35 U.S.C. 154(b) by 473 days.

(21) Appl. No.: 11/145,404

(22) Filed: Jun. 3, 2005

(65) Prior Publication Data

US 2006/0274584 A1 Dec. 7, 2006

(51) Int. Cl.
*G06F 1/16* (2006.01)

(52) U.S. Cl. .............. 361/724; 361/685; 312/223.1; 312/223.2; 369/75.11

(58) Field of Classification Search ........... 361/683, 361/685, 724–727; 312/223.1, 223.2; 369/75.11
See application file for complete search history.

(56) References Cited

U.S. PATENT DOCUMENTS

| | | | | |
|---|---|---|---|---|
| 2,470,185 A * | 5/1949 | Pietz | ............ | 248/573 |
| 3,771,032 A | 11/1973 | Hender | | |
| 5,333,098 A * | 7/1994 | DeLuca et al. | ............ | 361/685 |
| 5,566,049 A * | 10/1996 | Nguyen | ............ | 361/685 |
| 5,858,509 A | 1/1999 | Polch et al. | | |
| 6,377,450 B1 * | 4/2002 | Gan | ............ | 361/685 |
| 6,487,072 B2 | 11/2002 | Mercer et al. | | |
| 6,498,723 B1 | 12/2002 | Konshak et al. | | |
| 6,583,965 B1 | 6/2003 | Forbord et al. | | |
| 6,621,694 B2 | 9/2003 | Lee et al. | | |
| 6,628,513 B1 | 9/2003 | Gallagher et al. | | |
| 6,633,481 B2 | 10/2003 | Pavol | | |
| 6,665,633 B2 | 12/2003 | Fioravanti et al. | | |
| 6,862,173 B1 | 3/2005 | Konshak et al. | | |
| 7,133,291 B2 * | 11/2006 | Carlson et al. | ............ | 361/727 |
| 7,177,145 B2 * | 2/2007 | Carlson et al. | ............ | 361/685 |
| 2001/0036026 A1 | 11/2001 | Chen et al. | | |
| 2003/0043550 A1 | 3/2003 | Ives | | |
| 2004/0100764 A1 | 5/2004 | Hanson et al. | | |
| 2006/0061955 A1 * | 3/2006 | Imblum | ............ | 361/685 |

FOREIGN PATENT DOCUMENTS

JP 2002-208269 A 7/2002

* cited by examiner

*Primary Examiner*—Jayprakash N Gandhi
*Assistant Examiner*—Anthony Q Edwards
(74) *Attorney, Agent, or Firm*—Fellers, Snider, et al.

(57) ABSTRACT

A carrier and associated methodology for removably supporting a plurality of data storage devices as a multiple disc array in a distributed storage system. The carrier defines attachment features for fixing each of the data storage devices to the carrier preventing movement of the data storage devices in relation to the carrier in response to a vibration stimulus. This reduction in vibration stimulus allows the individual data storage devices in the multiple disc array to increase the number of track per storage area. This benefit can be used to increase capacity, increase performance and increase reliability of the multiple disc array.

20 Claims, 8 Drawing Sheets

STORAGE ARRAY WITH ENHANCED RVI SUPPRESSION

FIELD OF THE INVENTION

The claimed invention relates generally to the field of data storage and more particularly, but not by way of limitation, to an apparatus and method for reducing the rotational vibration index (RVI) in bulk storage used in a distributed storage system.

BACKGROUND

Distributed storage systems use hardware such as a central processing unit (CPU), one or more disc controllers, and a plurality of data storage devices logically grouped together as bulk storage. Computer program code operating on the CPU and/or disc controllers controls the manner in which user data is stored and accessed. User data can be stored in various fault tolerant schemes, such as in redundant array of independent drive (RAID) formats, for example. Multiple RAID formats can advantageously be employed concurrently within the storage system. The amount of available storage capacity, as well as the rate at which the storage capacity can be dynamically allocated, both significantly contribute to the storage system marketability.

The use of multiple disc arrays (MDAs) to mechanically define units of bulk storage results in a more reliable and a more readily scalable storage system. The multiple disc arrays are preferably a plurality of data storage devices that are both physically and logically grouped to function as a block of memory space to the storage system. Reliability is enhanced in that if a particular data storage device in the MDA is failing then it can be quickly and easily swapped out with a replacement data storage device. Scalability is enhanced by the ability to attach additional MDAs to the storage system and allocate them individually or collectively as logical devices as the need for storage capacity changes.

As these advantages spur the demand for more prevalent use of MDAs, attention will be directed toward effective and efficient carrier methodologies for them. Also, as storage density and processing time requirements continually result in ever-higher performance standards, vibration-related interferences that were once ignored as negligible come into play because they create data transfer errors. Individual data storage devices are designed to operate in a relatively high vibration environment, thereby decreasing the data storage capacity in terms of the number of tracks per inch (TPI) that the data storage device is capable of. If vibrations can be reduced, such as by reducing external excitations from other data storage devices in an MDA, then the TPI of a data storage device can be increased, thereby increasing its data storage capacity. What is needed is a solution offering both the flexibility of the MDA but within a mechanical structure that effectively eliminates rotational vibration interference (RVI). It is to these improvement features that the embodiments of the present invention are directed.

SUMMARY OF THE INVENTION

Embodiments of the present invention are generally directed to a bulk storage system preventing rotational interference by reducing the RVI to substantially zero.

In some embodiments a carrier is provided for removably supporting a plurality of data storage devices as a multiple disc array in a distributed storage system. The carrier defines attachment features for fixing the data storage devices to the carrier preventing movement of the data storage devices in relation to the carrier in response to a vibration stimulus.

In some embodiments a method is provided comprising providing a carrier that is adapted for receivingly engaging a plurality of data storage devices forming a multiple disc array; placing a plurality of data storage devices in the carrier; and fixing each data storage device to the carrier to increase the effective mass of each data storage device, preventing movement of the data storage devices in relation to the carrier in response to a vibration stimulus.

In some embodiments a bulk storage system is provided comprising a plurality of data storage devices supported by a carrier and configured for storing and retrieving data; and means for preventing rotational vibration interference in the data storage devices when storing and retrieving the data.

These and various other features and advantages which characterize the claimed invention will become apparent upon reading the following detailed description and upon reviewing the associated drawings.

DETAILED DESCRIPTION

Figure 1:
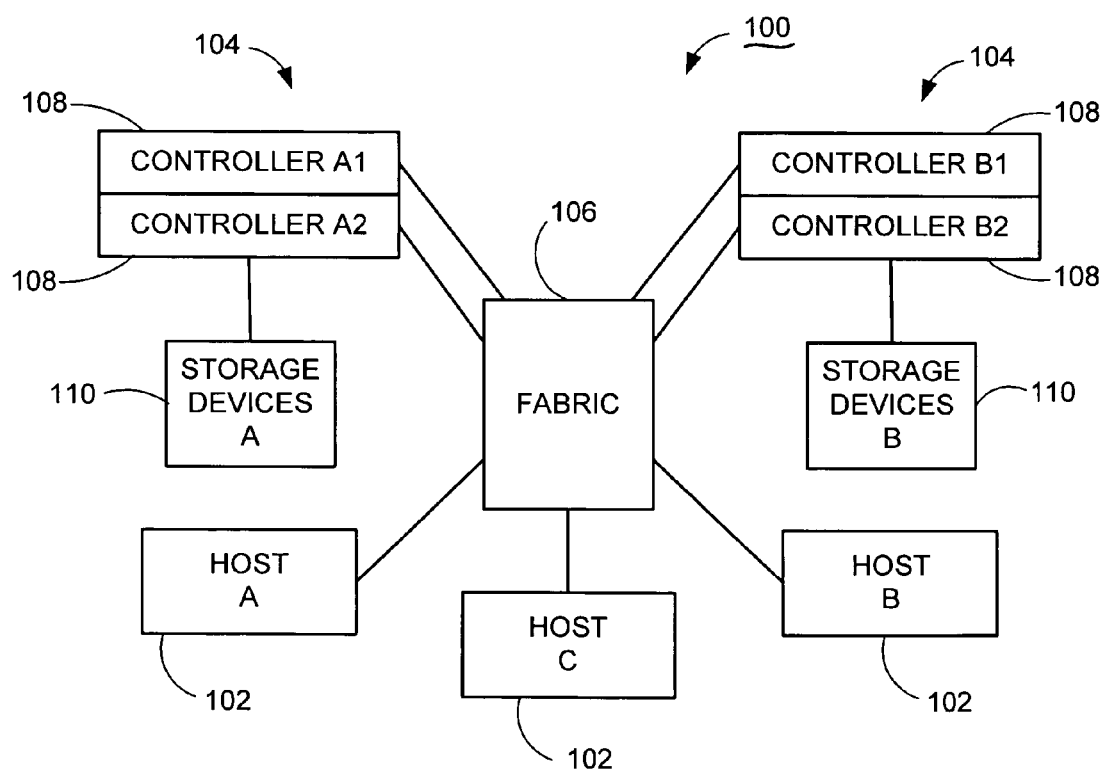
FIG. 1 is a diagrammatic illustration of a distributed storage system in which embodiments of the present invention are adaptable.

To illustrate an exemplary environment in which presently preferred embodiments of the present invention can be advantageously practiced, FIG. 1 shows a computer-based system 100 characterized as a storage area network (SAN), or more generally referred to as a distributed storage system, utilizing bulk storage.

The system 100 includes a number of host computers 102, respectively identified as hosts A, B, and C. The host computers 102 interact with each other as well as with a pair of data storage arrays 104 (denoted A and B, respectively) via a fabric 106. The fabric 106 is preferably characterized as fibre-channel based switching network, although other configurations can be utilized as well, including the Internet.

Each array 104 includes a pair of controllers 108 (denoted A1, A2 and B1, B2) and a set of data storage devices 110 preferably characterized as disc drives operated as a RAID. The controllers 108 and data storage devices 110 preferably utilize a fault tolerant arrangement so that the various controllers 108 utilize parallel, redundant links and at least some of the user data stored by the system 100 is stored in a redundant format within at least one set of the data storage devices.

It is further contemplated that the A host computer 102 and the A data storage array 104 can be physically located at a first site, the B host computer 102 and B storage array 104 can be physically located at a second site, and the C host computer 102 can be yet at a third site, although such is merely illustrative and not limiting.

Figure 2:
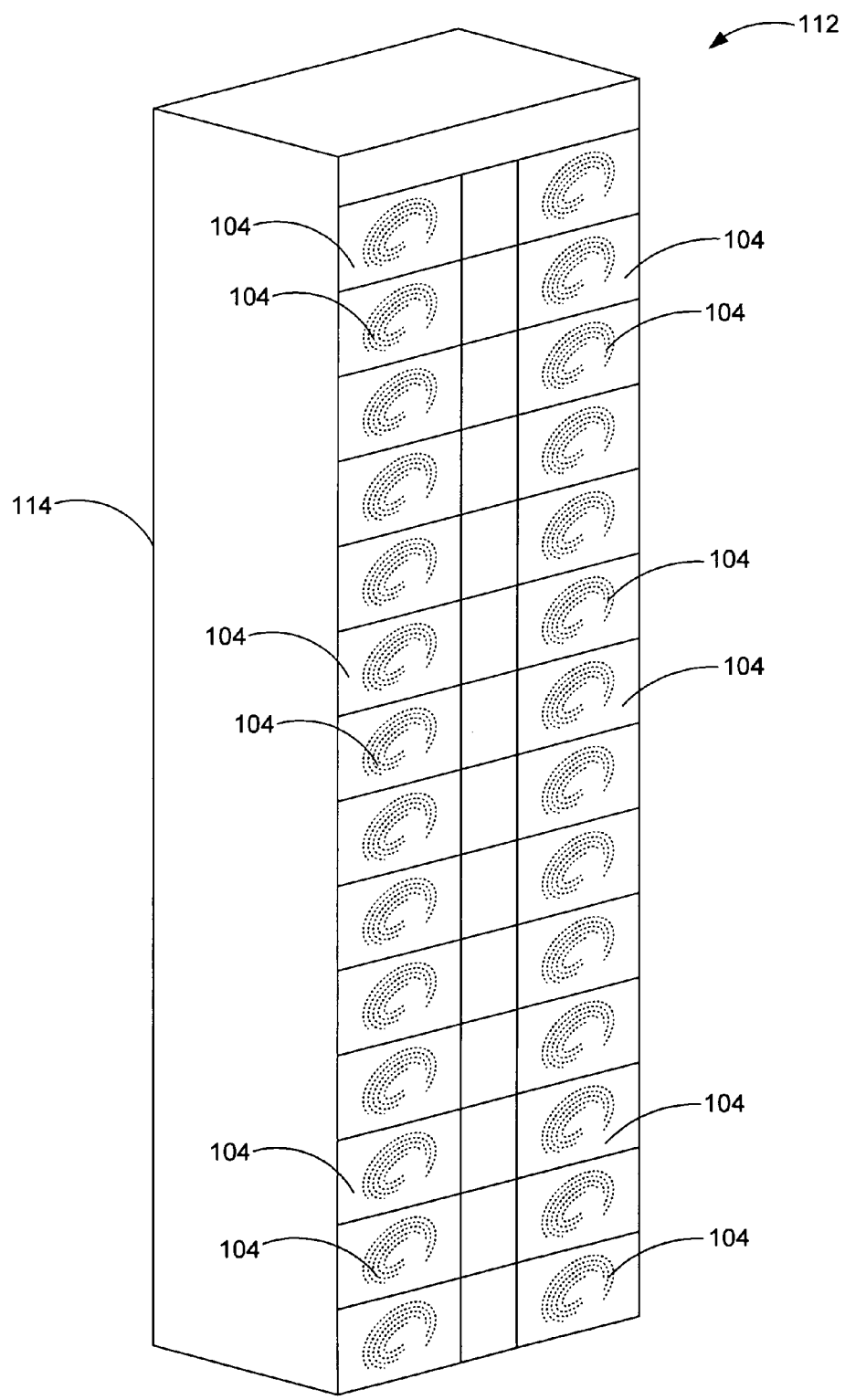
FIG. 2 is an isometric view of a bulk storage array comprising the storage devices of FIG. 1.

Turning now to FIG. 2 which is an isometric view of a bulk storage system 112 constructed in accordance with novel embodiments of the present invention to include a plurality of the storage arrays 104. Because each array 104 contains a plurality of data storage devices, they are sometimes referred to herein as a multiple disc array ("MDA") 104. The MDAs 104 are also sometimes referred to herein as "storage bricks" of data storage capacity. An MDA 104 generally has a convertible plurality of componentized data storage devices, such as disc drive devices. By "convertible" it is meant that one or more data storage devices can be readily replaced, added, or removed in an existing MDA 104, or that a different MDA 104 can readily be swapped that is adapted for supporting a different number, size or arrangement of data storage devices. By "componentized" it is meant that the data storage devices and associated control electronics in the MDA 104 are integrated so as to be logically presented to the distributed storage system 100 selectively as one or more blocks of data storage capacity.

Figure 3:
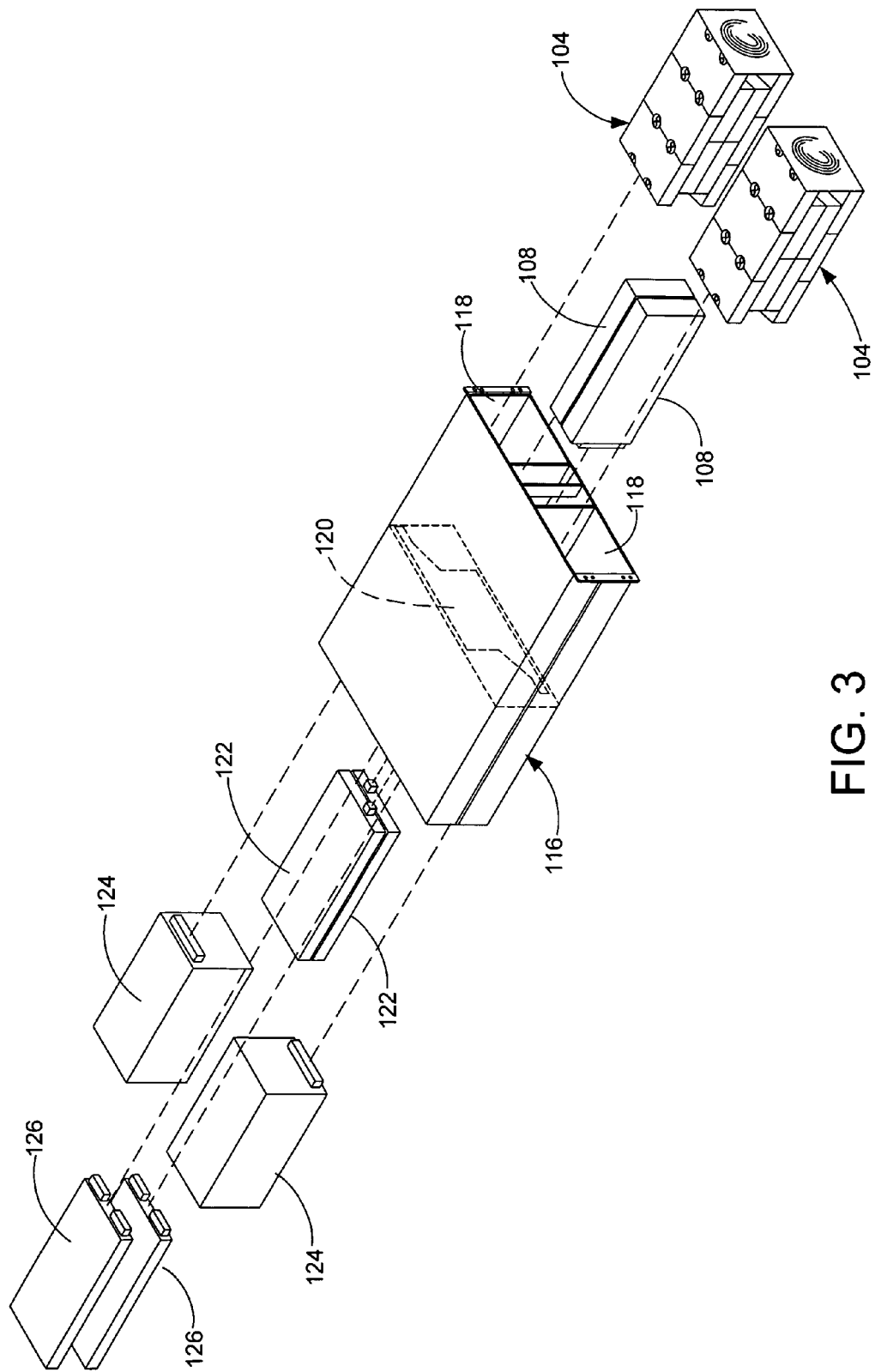
FIG. 3 is an exploded isometric view of a shelf supporting components of the bulk storage array of FIG. 2.

A cabinet 114 supports a plurality of shelves that support, in turn, the MDAs 104. FIG. 3 is an exploded isometric illustration of a shelf 116 that is constructed in accordance with embodiments of the present invention. Each shelf 116 defines one or more cavities 118 into each of which an MDA 104 is removably engageable. In the illustrative embodiment of FIG. 3, the shelf 116 defines two cavities 118 for receiving two MDAs 104. Equivalent alternative embodiments contemplate a different number of MDAs 104 per shelf 116.

The MDAs 104 electrically engage a backplane 120 for communicating within the distributed storage system 100. In the illustrative embodiments of FIG. 3, the controllers 108 connect to the same side of the backplane 120. Additionally, battery units 122, power supply units 124, and interface units 126 connect to the opposing side of the backplane 120.

Figure 4:
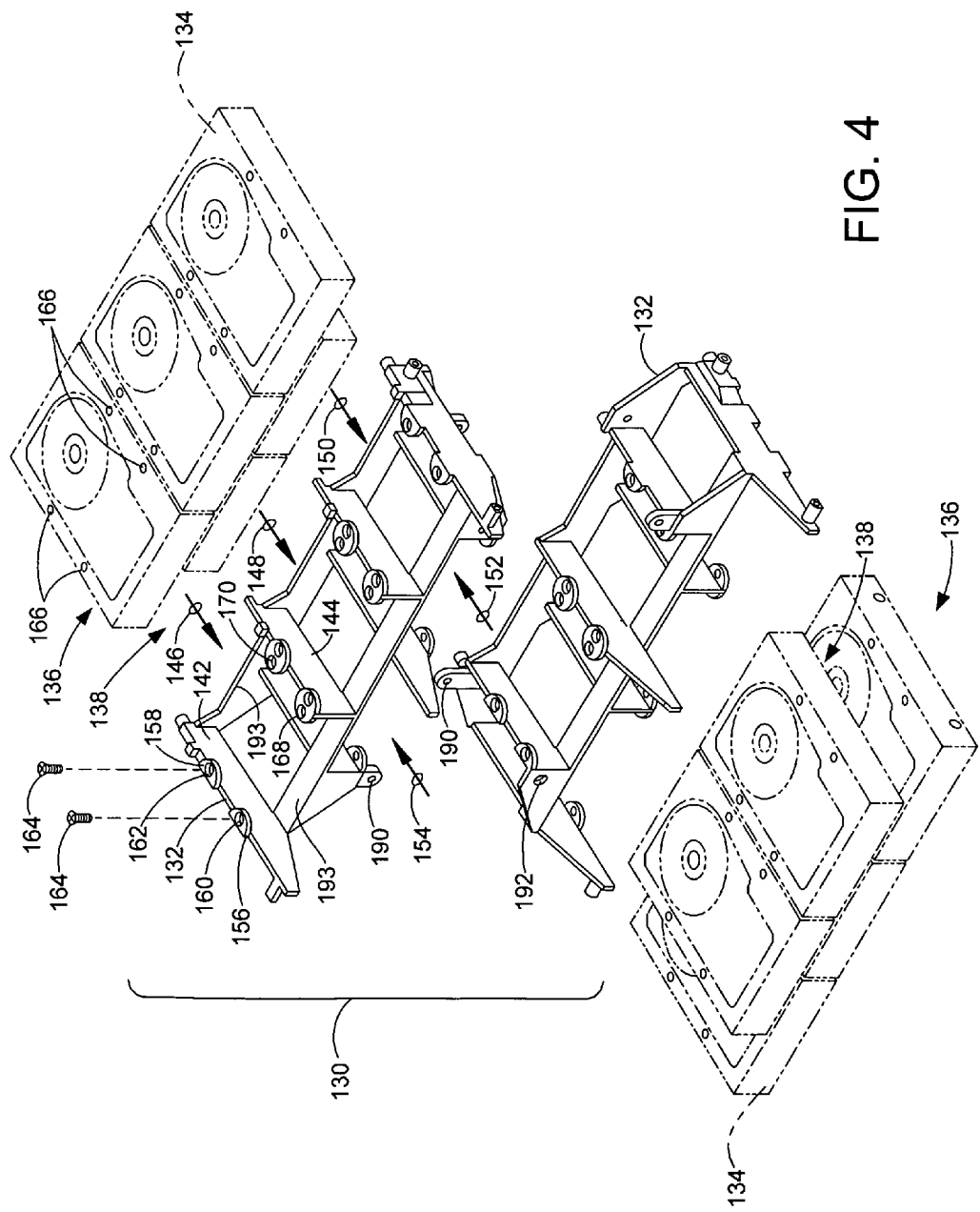
FIG. 4 is an exploded isometric view of a carrier portion of the multiple disc array of FIG. 3.

FIG. 4 is an exploded isometric view of the MDA 104 illustrating embodiments wherein a carrier 130 comprises a pair of partitions 132 that are joined together. Preferably, the partitions 132 are substantially identical to simplify manufacturing and assembly processes. In this arrangement the joined partitions 132, each supporting a plurality of data storage devices 134, are receivingly engageable within one cavity 118 of the shelf 116 (FIG. 3). Preferably, the shelf 116 is fixed within the cabinet 114 and the carrier 130 is insertable and removable from the shelf 116 so that individual data storage devices 134 can be readily added, removed or replaced. In other embodiments of the present invention a carrier 130 can be replaced with another carrier having different data storage device supporting features for electrically connecting a different selected number, size, or arrangement of data storage devices 134.

In the illustrative embodiments of FIG. 4 each partition 132 supports a first linear array 136 of three data storage devices 134 and a second linear array 138 of two data storage devices 134. The partition 132 defines opposing transverse side members 142, 144 defining a channel 146 for receivingly engaging one of the data storage devices 134 therein. Similarly, channels 148, 150 are defined for receivingly engaging the other two data storage devices 134 in the first array 136, and channels 152, 154 are defined for receivingly engaging the data storage devices 134 in the second array 138.

Tab members 156, 158 extend transversely from the distal end of the side member 142 and define attachment features 160, 162, respectively, for fixing the data storage device 134 to the partition 132. In some embodiments the attachment features 160, 162 can comprise a clearance aperture for passing a fastener 164 therethrough for engaging an attachment point 166 of the data storage device 134. For example, the fasteners 164 can comprise threaded fasteners that engage threaded openings provided in the data storage device 134. In the illustrative embodiments of FIG. 4 there are four attachment features 160, 162, 168, 170 for fixing each data storage device 134.

Figure 5:
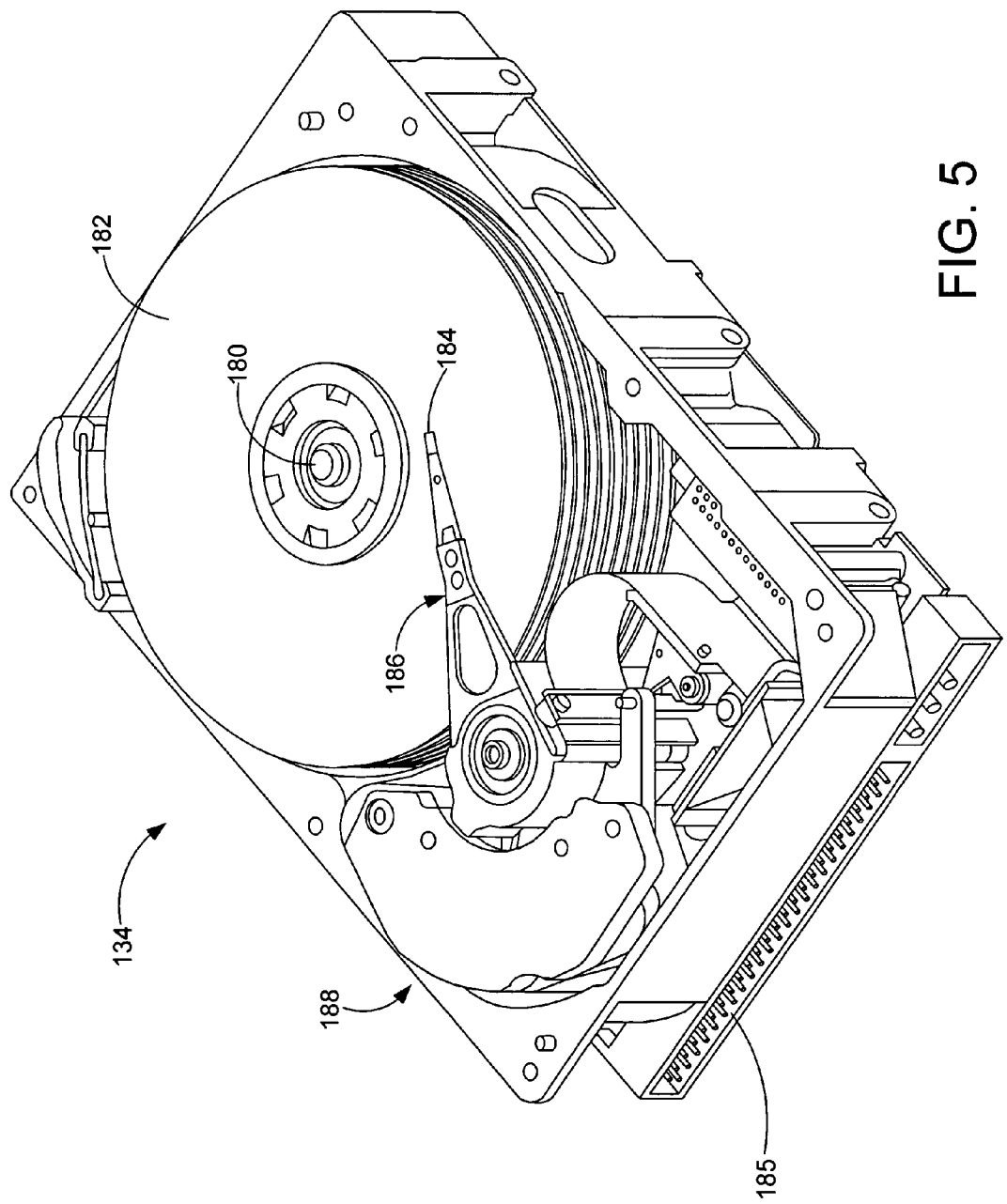
FIG. 5 is an isometric view of a data storage device useful in the embodiments of the present invention but with a portion of the enclosure removed for clarity.

FIG. 5 is an isometric view of an illustrative embodiment of the data storage device 134 with a cover portion of the enclosure removed for viewing the internal components. A motor 180 rotates a data storage medium ("disc" or "disc stack") 182 in a data transfer relationship with a head 184. A connector 185 transfers all communications between the data storage device 134 and external devices, such as the hosts 102. The head 184 is supported by a pivoting actuator 186 that is moved by a voice coil motor 188. The actuator 186 is accelerated during a seek operation to radially position the head 112 to a destination track.

The actuator seek torque during acceleration and deceleration imparts rotational vibration stimuli to the enclosure which, in turn, creates an opposite reaction torque. The reaction torque can create rotational vibration interference that adversely affects the data storing and retrieving performance of the device 134 itself, and of adjacent devices 134 in the same support structure. Where a plurality of the devices 134 are grouped together in an MDA, the rotational vibration interferences are compounded.

The embodiments of the present invention eliminate rotational vibration interferences by utilizing the attachment features 160, 162, 168, 170 to fix the data storage device 134 to the partition 132 portion of the carrier 130. This prevents relative movement between the data storage device 134 and the carrier 130 in response to a vibration stimulus, such as the actuator 186 seek torque. By positively fixing the data storage device 134 to the carrier 130, the mass of the data storage device 134 is effectively increased to include the mass of the carrier 130 and the group of other data storage devices 134 in the MDA 104. The rotational vibration interference created by the actuator seek torque is thus reduced to a negligible amount because the mass of the actuator 186 is insignificantly small in comparison to the effective mass of the data storage device 134.

Rotational vibration results from any device with a rotating mass. The present assignee has developed the RVI to quantify this phenomenon. U.S. Pat. No. 6,665,633, for example, provides a more detailed derivation of the RVI and is incorporated herein by reference. Generally, the RVI relates the impact of rotational vibration stimuli of a mechanical mounting environment to the data transfer performance of the data storage device. Rigidly fixing each of the data storage devices to the carrier makes it possible to reduce the RVI to substantially zero rads/sec by making the mass of the actuator insignificantly small in comparison to the effective mass of the data storage device.

External rotational vibration, such as RVI from an adjacent drive, impacts the data storage device's 134 ability to track-follow, which negatively impacts performance for reads and writes since additional retries can be required. Each retry can incur the cost of an additional rotation of the disc 182. For example, in a 15,000 revolutions per minute data storage device 134 with a 4 millisecond (ms) seek time, each additional rotation adds 4 ms to the read or write service time.

Even one or two retries would double the average service time. In addition, when writing, a mistake during track-following can, in rare instances, cause data to be written in an incorrect location, leading to data corruption.

Figure 6:
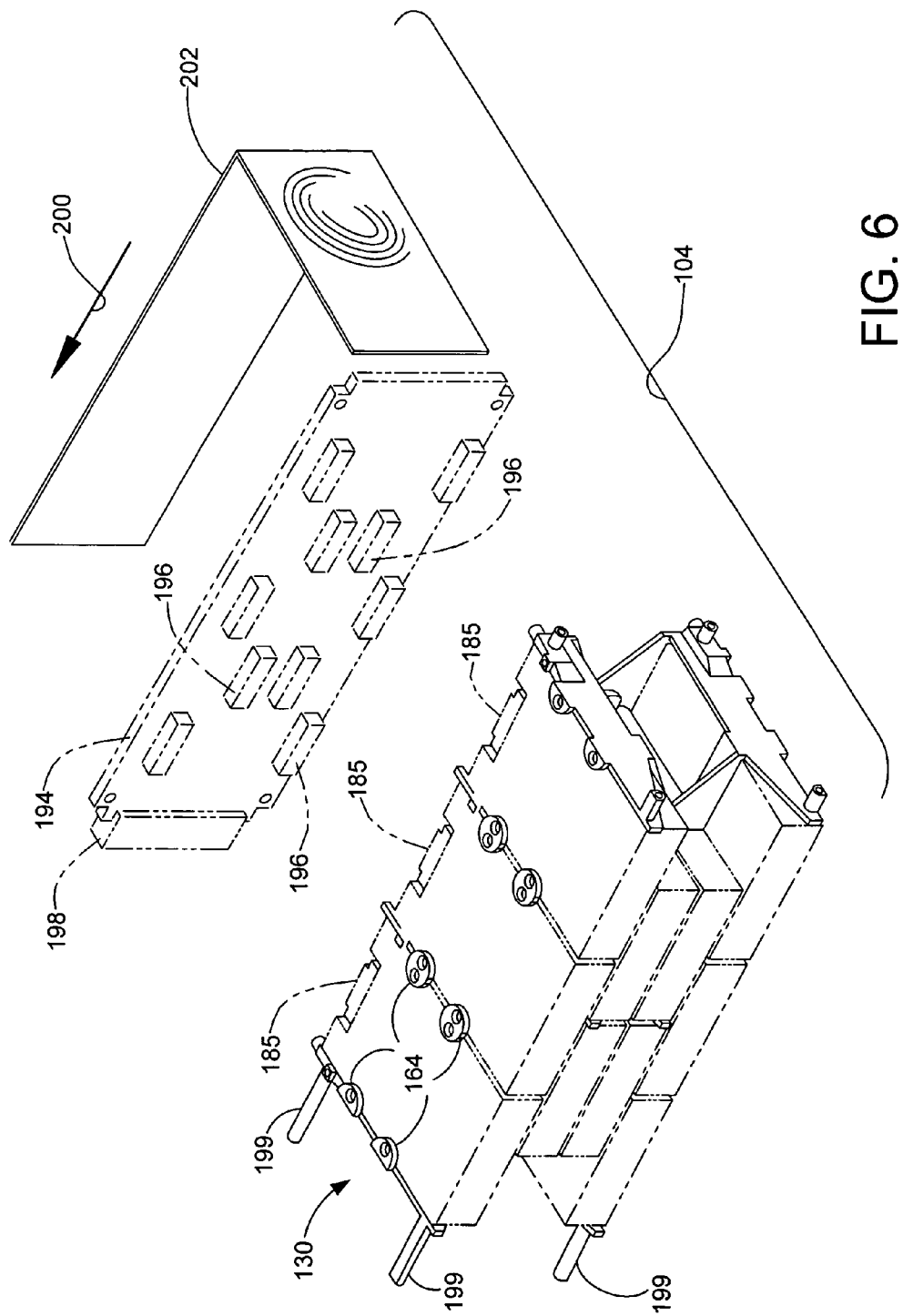
FIG. 6 is an exploded isometric view of the multiple disc array of FIG. 3.

As illustratively shown in FIGS. 4 and 6, in some embodiments the attachment features 160, 162, 168, 170 define openings for passing the fasteners 164 therethrough for engaging the data storage device 134 against the carrier 130. Preferably, alignment surfaces 193 formed by the partition 132 serve to operably align the data storage device 134 with the attachment features 160, 162, 168, 170 when slidingly engaging the data storage device 134 with the carrier 130. Preferably, the attachment features are adapted for fixing the data storage device 134 to the carrier 130 at two or more different points of engagement. In the illustrative embodiments of FIGS. 4 and 6, for example, the attachment features are adapted for fixing four medial portions of the data storage device 134 to the carrier 130.

The partitions 132 have first joining features 190 that are alignable with second attachment features 192 for joining the two partitions 132 together. For example, the first joining feature 190 can define a clearance aperture for passing a fastener (not shown) therethrough and fixingly engaging the second attachment feature 192.

In the illustrative embodiments of FIG. 6 the connectors 185 of the data storage devices 134 are operably situated for electrical connection along a coplanar arrangement. The carrier 130 also supports a circuit board 194 having a number of connectors 196 arranged to align with the connectors 185 of the respective data storage devices 134. The circuit board 194 preferably further has a connector 198 that is adapted to connect to the electronics of the bulk storage system 112 via the backplane 120 (FIG. 3).

It will be noted that in the illustrative embodiments of FIG. 6, the connector 198 is aligned for operably connecting with the backplane 120 by moving the circuit board 194 in a direction 200 along the longitudinal depth of the shelf 116 (FIG. 3). One or more alignment features 199 are preferably configured for operably aligning the carrier 130 with the backplane 120 when slidingly engaging the carrier 130 with the shelf 116. In this manner, the electrical connection between the circuit board 194 and the bulk storage system 112 is readily made as a result of inserting the MDA 104 into the shelf 116 (FIG. 3). The circuit board 194 is selectively configured such that upon operatively inserting the carrier 130, the host 102 can be placed in electrical communication with each and every data storage device 134 in the MDA 104, and the data storage devices 134 can be in electrical communication with other data storage devices 134 both inside and outside a particular MDA 104.

The carrier 204 can support a wrapper 202 for enclosing the data storage devices 104 and/or the circuit board 260 for electrical shielding. In the illustrative embodiments of FIG. 6 the wrapper 202 covers just the front and circuit board portions of the MDA 104.

Figure 7:
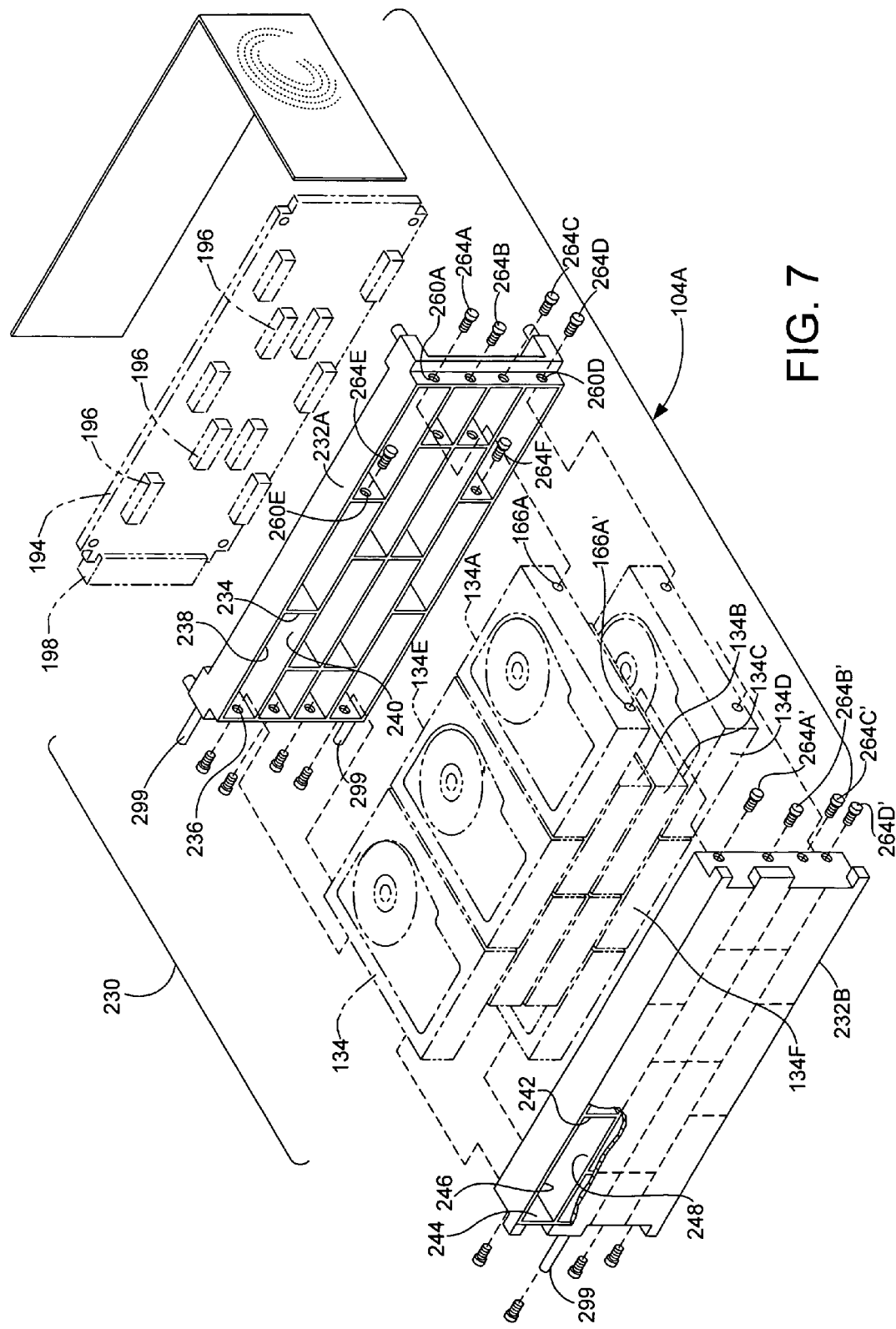
FIG. 7 is an exploded isometric view of a multiple disc array constructed in accordance with alternative embodiments of the present invention.

FIG. 7 is an exploded isometric view illustrating an MDA 104A constructed in accordance with alternative embodiments of the present invention. The MDA 104A supports the circuit board 194 in a similar manner as discussed above. However, the illustrative embodiments of FIG. 7 have a carrier 230 construction wherein the data storage devices 134 are sandwiched between a partition member 232A and an opposing cap member 232B.

The partition 232A comprises channel surfaces defining a number of channels, within each of which a data storage device 134 is slidingly engageable and operatively alignable with the circuit board 194. For example, the partition 232A comprises a first pair of opposing surfaces 234, 236 that are spaced-apart defining an operable mating relationship with a cross-sectional width of the data storage device 134. The partition 232A comprises a second pair of opposing surfaces 238, 240 that are spaced-apart defining an operable mating relationship with a cross-sectional height of the data storage device 134. The two pair of opposing surfaces 234, 236 and 238, 240 thereby define a tubular closed passage circumscribing a cross section of a data storage device 134.

In the carrier 230 construction of FIG. 7, the channel defined by the partition 232A supportingly engages a proximal end of the data storage device 134 adjacent the circuit board 194. The channel is continued in the cap 232B by discontinuous surfaces 242, 244 and 246, 248 that similarly supportingly engage a distal end of the data storage device 134. Preferably, the surfaces defining the channels do so in a closely mating relationship with the cross-sectional size of the data storage device so as to provide alignment surfaces for aligning the attachment features 260 with the attachment points 166 of the data storage devices.

In this arrangement the data storage devices 134 are used to structurally link the partition 232A and the cap 232B. Although not shown, in alternative equivalent embodiments the MDA 104A can comprise attachment portions of the partition 232A and cap 232B for joining them together directly, or attachment linkages can be provided for doing so.

In the manner described, the data storage devices 134 are sandwiched between the partition 232A and the cap 232B within a channel. As above, the partition 232A and the cap 232B define attachment features 260 for fixing each data storage device 134 to the carrier 104A, thereby preventing relative movement between each data storage device 134 and the carrier 104A in response to vibration stimuli. However, the illustrative carrier 104A has attachment features that fix each data storage device to the partition 232A at proximal ends thereof and that fix each data storage device to the cap 232B at opposing distal ends thereof.

For example, fastener 264A engages attachment point 166A at a proximal end of data storage device 134A for fixing the data storage device 134A to the carrier 104A. Fastener 264A' engages attachment point 166A' at a distal end of the data storage device 134A for fixing the data storage device 134A to the carrier 104A. Similarly, fastener 264B fixes data storage device 134B at a proximal end thereof, and fastener 264B' fixes data storage device 134B at a distal end thereof. Fasteners 264C, 264D and 264C', 264D' likewise fix the data storage devices 134C, 134D, respectively, at the proximal and distal ends.

It will be noted that data storage device 134E is interposed between two data storage devices, requiring additional fasteners for fixing it to the carrier 230. In the illustrative embodiments of FIG. 7 a fastener 264E can be installed to fix the data storage device 134E before installing the data storage device 134A. Alternatively, the fastener 264E for fixing the data storage device 134E can be positioned elsewhere such that its installation is not interfered with by the fixed position of the data storage device 134A. The distal end of data storage device 134E can be fixed in like manner, and the data storage device 134F likewise.

Figure 8:
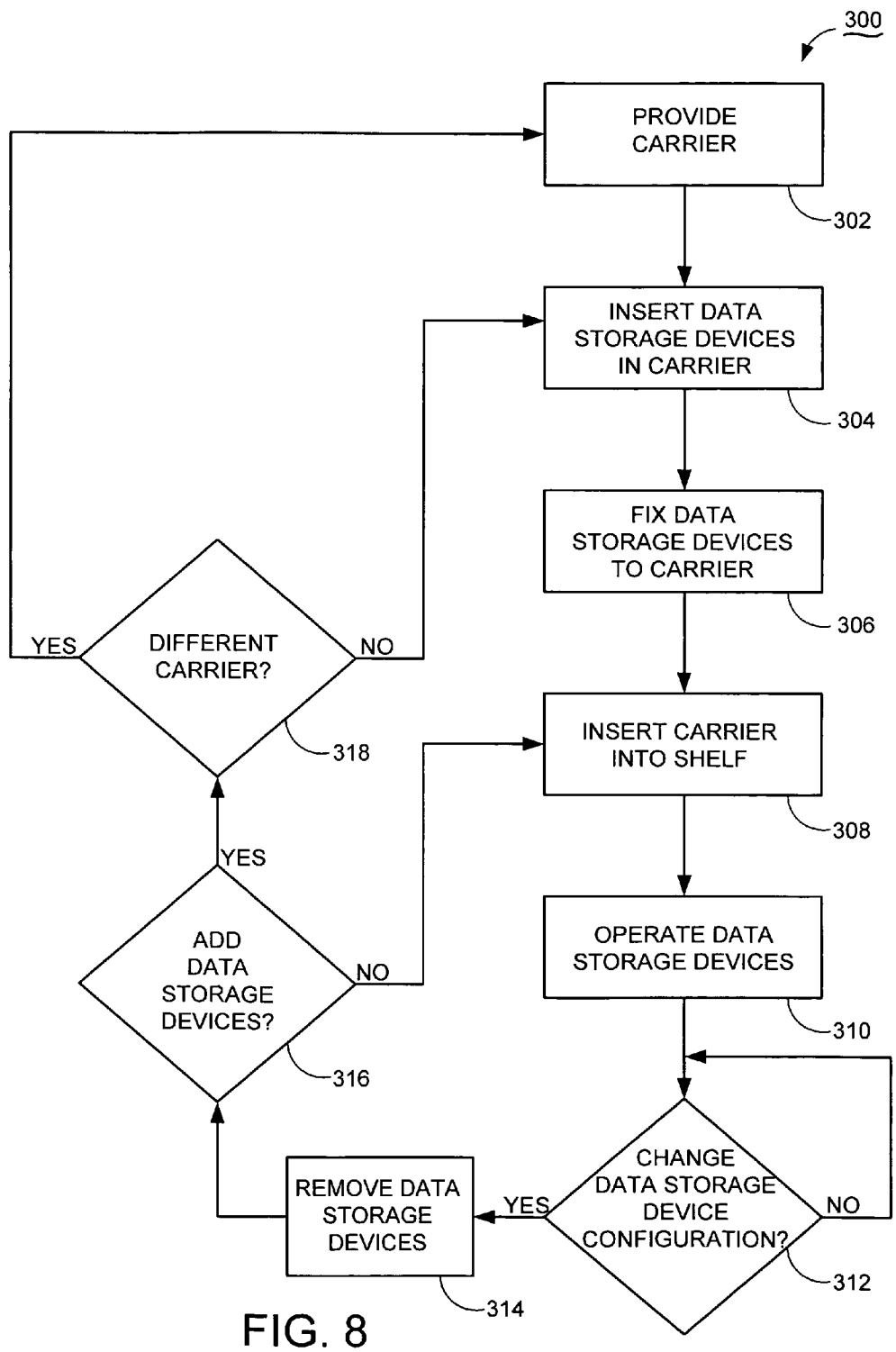
FIG. 8 is a flowchart of a method for providing bulk storage to a distributed storage system.

FIG. 8 is a flowchart illustrating a method 300 for providing bulk storage to a distributed storage system. In block 302 a carrier, such as the carriers 130, 230 for example, are provided in accordance with the number and form factor of data storage devices that are anticipated for use. In block 304 a plurality of data storage devices are inserted into the carrier. In block 306 each of the data storage devices are positively fixed to the carrier in order to effectively increase the mass of each of the data storage devices in relation to a calculation of inertia. That is, by fixing each data storage device to the carrier there is no movement of the data storage device in relation to the carrier in response to a vibration stimulus. Accordingly, each data storage device is made capable of responding to the actuator seek acceleration vibration stimulus with substantially a zero RVI. The fasteners can be threaded fasteners, such as is illustrated in FIGS. 4 and 7.

With all data storage devices fixed to the carrier, the carrier is then inserted into a shelf of the data storage array in block 308 and thereby placed in electrical communication with the distributed storage system. Normal operation of the multiple disc array commences in block 310, until such a time when the determination of block 312 is that the configuration of data storage devices forming the multiple disc array needs to be changed.

It might be necessary to remove a data storage device that is malfunctioning, or perhaps to change or upgrade the type of data storage device being used. In any event, in block 314 data storage device(s) are removed from the carrier in accordance with the configuration change. The number removed in block 314 can be zero. In block 316 it is determined whether data storage devices are to be added to the carrier in accordance with the configuration change. It might be necessary to add a data storage device to replace one removed in block 314, or perhaps more data storage devices are added in order to increase the bulk storage capacity of the MDA.

If the determination of block 316 is no, then control returns to block 308; if it is yes, then control passes to block 318 where the determination is made as to whether the new configuration requires using a different carrier. If the determination of block 318 is no then control passes to block 304; if it is yes then control passes to block 302.

Generally, the embodiments of the present invention contemplate a carrier (such as 130, 230) for removably supporting a plurality of data storage devices (such as 134) as a multiple disc array (such as 104, 104A) in a distributed storage system (such as 100). The carrier defines attachment features (such as 160, 260) for fixing the data storage devices to the carrier, and thereby preventing movement of the data storage devices in relation to the carrier in response to a vibration stimulus.

The attachment features can define an opening for passing a fastener (such as 164, 264) therethrough for engaging each data storage device against the carrier. The fastener can comprise a threaded fastener. Two attachment features in combination with respective fasteners can fix each data storage device to the carrier at two different points of engagement. In some embodiments the attachment features fix each data storage device to the carrier at a proximal end and at an opposing distal end of the data storage device. Preferably, the carrier has an alignment feature (such as 199, 299) for operably aligning the carrier with an electrical connection of the array storage system when slidingly engaging the carrier with the shelf. The carrier also preferably has a second alignment feature (such as 193, 293) for operably aligning the data storage device with the attachment feature when slidingly engaging the data storage device into the carrier.

A method (such as 300) is contemplated comprising providing the carrier that is adapted for receivingly engaging a selected plurality of the data storage devices and presenting them as a multiple disc array (such as 302). The plurality of data storage devices are placed in the carrier (such as 304) and each one is fixed to the carrier to increase the effective mass of each data storage device, preventing movement of the data storage devices in relation to the carrier in response to a vibration stimulus (such as 306). The placing step can be characterized by sliding the data storage device into the carrier and in alignment with an attachment feature of the carrier for fixing the respective data storage device with the carrier.

The providing step can be characterized by the carrier defining an opening for passing a fastener therethrough for engaging the data storage device against the carrier. In such case the fixing step can be characterized by advancing a threaded fastener to engage the data storage device against the carrier. Preferably, the fixing step can be characterized by fixing the data storage device to the carrier at two different points of engagement. The fixing step can further be characterized by fixing the data storage device to the carrier at a proximal end and at an opposing distal end of the data storage device.

With each data storage device fixed to the carrier, the method can further comprise sliding the carrier into the shelf of the bulk storage system to operably engage an electrical connection placing the data storage devices in communication with a network.

A bulk storage system is contemplated comprising a plurality of data storage devices supported by a carrier and configured for storing and retrieving data; and means for preventing rotational vibration interference in the data storage devices when storing and retrieving the data. The means for preventing can be characterized by fixing each of the data storage devices to the carrier to effectively increase the mass of each data storage device. The means for preventing can be characterized by threadingly attaching the data storage devices to the carrier. The means for preventing can be characterized by fixing each data storage device to the carrier at more than one point of engagement. The means for preventing can be characterized by fixing each data storage device to the carrier at a proximal end and at an opposing distal end of the data storage device. The means for preventing can be characterized by slidingly aligning each data storage device in the carrier and slidingly aligning the carrier in an array storage system (such as 308).

The method can further be characterized by stopping normal operation to change the configuration of data storage devices (such as 312). In such case, data storage devices can be removed from the multiple disc array (such as 314) and/or added to the multiple disc array (such as 316). If the current carrier is not adapted for the desired new configuration, a new carrier can be used (such as 318).

For purposes of the description and appended claims, the term "means for preventing" expressly does not contemplate carriers that support the data storage devices loosely. By "loosely" it is meant that the data storage device is supported in a manner permitting displacement of the data storage device with respect to the carrier in response to a vibration stimuli.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the number and size of data storage devices making up an MDA, without departing from the spirit and scope of the present invention.

In addition, although the embodiments described herein are directed to a data storage system, it will be appreciated by those skilled in the art that the claimed subject matter is not so limited and various other processing systems can utilize the embodiments of the present invention without departing from the spirit and scope of the claimed invention.

What is claimed is:

1. An apparatus comprising a carrier for removably supporting a plurality of data storage devices in a multiple disc array, the carrier comprising a first partition rigidly affixed to a second partition, the first partition rigidly attaching a selected portion of said plurality of data storage devices thereto and the second partition rigidly securing the remaining portion of said plurality of data storage devices thereto to increase an effective mass of a selected one of the data storage devices to a total mass of the first and second partitions and the plurality of data storage devices for rotational vibration interference (RVI) suppression.

2. The apparatus of claim 1 wherein the first partition comprises a first set of attachment features define openings for passing fasteners therethrough for engaging the respective data storage devices against the first partition.

3. The apparatus of claim 2 wherein the second partition comprises a second set of attachment features define openings for passing fasteners therethrough for engaging the respective data storage devices against the second partition.

4. The apparatus of claim 1 wherein the first and second partitions are substantially identical and the second partition is inverted with respect to the first partition.

5. The apparatus of claim 4 wherein the first partition comprises a first projection flange with an aperture therethrough, wherein the second partition comprises a second projection flange with an aperture therethrough, and wherein the carrier further comprises a fastener which extends through the respective apertures of the first and second projection flanges to attach the first partition to the second partition.

6. The apparatus of claim 1 further comprising an alignment feature for operably aligning the carrier with an electrical connection of a distributed storage system when slidingly engaging the carrier into a shelf.

7. The apparatus of claim 1 wherein the total number of said devices in the pluraliy of data storage devices is 2N, wherein a first N of said 2N devices are rigidly attached in direct contacting engagement against the first partition, and wherein a second N of said 2N devices are rigidly attached in direct contacting engagement against the second partition.

8. A method comprising:
providing a carrier comprising first and second partitions;
rigidly affixing each of a first plurality of data storage devices to the first partition and each of a second plurality of such devices to the second partition; and
rigidly affixing the first partition to the second partition so as to suppress rotational vibration interference (RVI) by increasing an effective mass of each of the individual devices to substantially equal a combined mass of the carrier and the first and second pluralities of devices.

9. The method of claim 8 wherein the first partition comprises a central plate and sidewalls extending therefrom in opposing directions to accommodate selected ones of said first plurality of devices on respective sides of the central plate, and wherein the first partition further comprises first attachment features extending from the respective sidewalls substantially parallel to the central plate to contactingly engage said devices to the first partition.

10. The method of claim 9 wherein the second partition comprises a central plate and sidewalls extending therefrom in opposing directions to accommodate selected ones of said second plurality of devices on respective sides of the central plate, and wherein the second partition further comprises second attachment features extending from the respective sidewalls substantially parallel to the central plate to contactingly engage said devices to the second partition.

11. The method of claim 8 wherein the second partition is substantially identical to the first partition and inverted with respect to the first partition.

12. The method of claim 8 wherein the first partition is rigidly affixed to the second partition by extending a threaded fastener through corresponding apertures of the first and second partitions to contactingly engage the second partition against the first partition without an intermediary elastomeric member therebetween.

13. The method of claim 8 further comprising sliding the carrier into a shelf of an array storage system to operably engage an electrical connection placing each data storage device in communication with a network.

14. The method of claim 8 wherein the total number of devices in said first plurality is equal to the total number of devices in said second plurality.

15. An array storage system comprising:
a number 2N of data storage devices where N is a plural number; and
means for preventing rotational vibration interference in the data storage devices by increasing an effective mass of each of the individual data storage devices to a total mass greater than a combined mass of the 2N data storage devices.

16. The system of claim 15 wherein the means for preventing comprises a carrier comprising a first partition rigidly affixed to a second partition, the first partition rigidly attaching a first N of the 2N devices thereto and the second partition attaching a second N of the 2N devices thereto.

17. The system of claim 16 wherein the means for preventing further comprises a threaded fastener which contactingly affixes a flange of the first partition to a flange of the second partition.

18. The system of claim 16 wherein the second partition is substantially identical to and inverted with respect to the first partition.

19. The system of claim 16 wherein each of the first and second partitions comprises a central plate with sidewalls depending therefrom, wherein selected ones of the respective 2N devices are mounted on opposing sides of each of the respective central plates between said sidewalls.

20. The system of claim 19 wherein each of the first and second partitions further comprise attachment features extending from the respective sidewalls substantially parallel to the central plate and through which fasteners extend to secure the respective 2N devices to the respective first and second partitions.

* * * * *